United States Patent [19]

Lee et al.

[11] Patent Number: 5,635,458

[45] Date of Patent: Jun. 3, 1997

[54] WATER-BASED DRILLING FLUIDS FOR REDUCTION OF WATER ADSORPTION AND HYDRATION OF ARGILLACEOUS ROCKS

[75] Inventors: Li-Jein J. Lee; Arvind D. Patel, both of Houston, Tex.

[73] Assignee: M-I Drilling Fluids, L.L.C., Houston, Tex.

[21] Appl. No.: 397,436

[22] Filed: Mar. 1, 1995

[51] Int. Cl.$^6$ .................. C07K 7/00; C09K 7/02
[52] U.S. Cl. .................. 507/240; 507/129; 507/136; 507/139; 507/110
[58] Field of Search .................. 507/240, 139, 507/129, 110

[56] References Cited

U.S. PATENT DOCUMENTS

| | | | |
|---|---|---|---|
| 1,460,788 | 7/1923 | Carman | 252/1 |
| 2,191,312 | 2/1940 | Cannon | 255/1 |
| 3,843,524 | 10/1974 | Perricone et al. | 252/1 |
| 4,142,595 | 3/1979 | Anderson et al. | 175/72 |
| 4,719,021 | 1/1988 | Branch, III | 252/8.51 |
| 4,828,724 | 5/1989 | Davidson | 507/110 X |
| 4,830,765 | 5/1989 | Perricone et al. | 252/8.51 |
| 4,941,981 | 7/1990 | Perricone et al. | 252/8.514 |
| 4,963,273 | 10/1990 | Perricone et al. | 252/8.514 |
| 5,082,576 | 1/1992 | Howson | 507/131 |
| 5,089,151 | 2/1992 | Hall et al. | 507/131 |

FOREIGN PATENT DOCUMENTS

| | | | |
|---|---|---|---|
| 2088344 | 10/1993 | Canada | C09K 7/02 |
| 0495579A3 | 7/1992 | European Pat. Off. | C09K 7/02 |
| 0634468A1 | 1/1995 | European Pat. Off. | C09K 7/02 |
| 2251876 | 7/1992 | United Kingdom | C09K 7/02 |
| 88/00063 | 2/1989 | WIPO | C07K 7/00 |

*Primary Examiner*—David B. Springer
*Attorney, Agent, or Firm*—Arnold, White & Durkee

[57] ABSTRACT

The present invention provides a water-based drilling fluid that reduces water adsorption and hydration of argillaceous rocks. The drilling fluid comprises a glycol with a molecular weight of less than about 200, an organic cationic material such as salts of choline or an organic salt of potassium, a filtration control agent, a viscosifier and water.

18 Claims, No Drawings

5,635,458

WATER-BASED DRILLING FLUIDS FOR REDUCTION OF WATER ADSORPTION AND HYDRATION OF ARGILLACEOUS ROCKS

FIELD OF THE INVENTION

The present invention relates to improved water-based drilling fluids that can be used for the drilling and stabilization of subterranean water-sensitive argillaceous formations and a method of preparing the same.

DESCRIPTION OF THE PRIOR ART

During oil and gas drilling operations, long sections of argillaceous formations having clay minerals as major constituents, such as shales, mudstones, siltstones, and claystones, often have to be penetrated before reaching the hydrocarbon bearing zones. Various drilling problems, such as bit balling, swelling or sloughing of wellbore, stuck pipe, and dispersion of drilled cuttings, are frequently encountered while drilling such formations. This is especially true when using water-based drilling fluids and can result in tremendous losses of operation time and increases in operation costs. Because of their tendency to become unstable on contact with water, such argillaceous formations are also commonly referred to as water-sensitive shales.

The unstable tendency of water-sensitive shales can be related to water adsorption and hydration of clays. When a water-based mud comes in contact with shales, water adsorption occurs immediately. This causes clays to hydrate and swell resulting in stress and/or volume increases. Stress increases can induce brittle or tensile failure of the formations, leading to sloughing, cave in, and stuck pipe. Volume increases, on the other hand, reduce the mechanical strength of shales and cause swelling of wellbore, disintegration of cuttings in drilling fluid, and balling up of drilling tools. The best way to minimize these drilling problems is to prevent water adsorption and clay hydration from occurring, and oil-based drilling fluids are believed to be the most effective for this purpose.

The inhibitive action of oil-based drilling fluids arises from the emulsification of brine in oil, which acts as a semi-permeable barrier that materially separates the water molecules from being in direct contact with the water-sensitive shales. Nevertheless, water molecules may flow through this semi-permeable barrier when the water activity of the oil-based drilling fluid differs from that of the shale formation. To prevent water molecules from being osmotically drawn into shale formations, the water activity of the oil-based drilling fluid is usually adjusted to a level equal to or less than that of the shales. Due to their detrimental impacts on environments, oil-based drilling fluids are subject to more stringent restrictions in their usage, and oftentimes water-based drilling fluids must be used instead. Thus, there is a need to improve the inhibitive properties of water-based drilling fluids so that water adsorption and hydration of clays can be controlled and/or minimized.

Treating water-based drilling fluids with inorganic chemicals and polymer additives is a common technique used to reduce hydration of shales. For example, the use of potassium chloride to stabilize shale formations was disclosed in an early U.S. Pat. No. 1,460,788; and it is still widely used by the industry for this purpose. Chemicals containing other inorganic cations, such as sodium, calcium, ammonium, cesium, etc., also have been claimed to provide or improve shale stabilization when used alone or with polymer additives in water-based drilling fluids. Examples of such chemicals and methods of use are disclosed, for example, in U.S. Pat. Nos. 4,142,595 and 3,843,524. Discussions on the shale stabilizing mechanisms of inorganic cations and polymer additives can be found in the literature.

In addition to inorganic cations and polymer additives, water-soluble organic polar compounds also can be used to provide shale stabilization and swelling inhibition. For example, the use of polyhydroxy alcohols, such as glycerol, glycol, sorbitol and erythritol, for combating heaving shales is disclosed in an early U.S. Pat. No. 2,191,312; the use of mixtures consisting of polyvalent metal/guanidine complexes, cationic starches, and polyglycols for shale stabilization is disclosed in U.S. Pat. No. 4,719,021; and the use of water-soluble glycol compounds and their derivatives for shale swelling inhibition is disclosed in U.S. Pat. Nos. 4,963,273, 4,941,981, and 4,830,765.

When using water-soluble glycols and similar compounds for swelling inhibition, the amount required to achieve satisfactory inhibition can be extremely high. For instance, as shown in U.S. Pat. No. 4,830,765, in order for propylene glycol, glycerin, and sorbitol to provide appreciable swelling inhibition on bentonite, a concentration of 50% by weight or more of the compound in a fluid phase is needed. The swelling of bentonite can be completely prevented only in highly concentrated glycol fluids, such as 100% propylene glycol and 100% tripropylene glycol. Similar results with propylene glycol also have been observed by Ardo and Tommervik in PCT Application No. PCT/N088/00063

The high concentrations of glycols and similar compounds required to achieve swelling inhibition not only significantly increase the drilling fluid cost, but also can cause severe problems with hydration of polymer additives, control of mud properties, and suspension of weighting agents, especially at high mud weights and high solids contents. This again can be related to the lack of water, which is necessary for mud additives to solubilize and function properly. Therefore, in order to reduce cost and minimize these undesirable side effects, the concentration of glycols and similar compounds may have to be controlled at a much lower level during drilling operation, which would make swelling inhibition less effective.

Accordingly, it would be an advancement in the art to provide an improved water-based drilling fluid that can prevent water adsorption and shale hydration more effectively while eliminating the high cost and poor polymer solubilization problems that can be expected at high concentrations of organic polar compounds.

SUMMARY OF THE INVENTION

Better shale inhibition can be obtained by introducing low molecular weight organic cations or organic salts of potassium to glycol fluids. The combination of organic cations and glycol improves inhibition through a simultaneous adsorption of the organic cations and glycols on shale surfaces. This is quite different from the prior art which relies only on the adsorption of glycol compounds or reduction of the water component. The incorporation of organic cations into the glycol fluids not only improves shale inhibition but also allows the glycols to be used at a lower concentration thus reducing cost and eliminating the aforementioned problems.

Accordingly, the present invention is a water-based drilling fluid that comprises: 1) a water-miscible glycol, with a molecular weight of less than about 200, such as ethylene glycol, diethylene glycol, triethylene glycol, propylene glycol, butylene glycol and mixtures thereof, at a concentration of at least 10% and preferably in a range from 30% to 70% by weight of the aqueous phase of the drilling fluid; 2) an organic cationic material or organic salt of potassium selected from the group consisting of choline hydroxide, choline chloride, choline carbonate, choline bicarbonate, choline sulfate, potassium acetate and potassium formate, in a range from 3% by weight up to saturation, based on the aqueous phase of the drilling fluid; 3) a filtration control agent for lowering fluid loss of the drilling fluid; 4) a viscosifier for suspension of solids and weighting material in the drilling fluid; and 5) water.

The inhibitive effects of the drilling fluid of this invention on water-sensitive shales have been evaluated by conducting swelling tests, dispersion tests, and triaxial tests that were conducted under simulated downhole conditions. The drilling fluids of this invention provide better swelling inhibition, cuttings stability, wellbore stabilization, and lower water adsorption compared with water-based drilling fluids formulated otherwise.

DESCRIPTION OF THE INVENTION

Since water adsorption is a nearly inevitable process in water-based drilling fluids and the mechanical strength of argillaceous rocks is adversely affected by water adsorption, it is ideal to replace the water with a polar fluid which can compete with water for adsorption but will not severely weaken the mechanical strength of argillaceous rocks when adsorbed. Glycols with a molecular weight of less than about 200, such as ethylene glycol, propylene glycol, butylene glycol, and their dimers and trimers are suitable substitutes for this purpose. Since these glycols are rather simple in chemical structure, they are hereby referred to as simple glycols.

The simple glycols have in common that they are slightly to moderately viscous, hygroscopic, colorless and odorless liquids completely miscible with water at all proportions. Unlike their polymeric derivatives, whose solubility in water depends on salinity and temperature, the simple glycols remain miscible with water at all temperatures even in the presence of large amounts of electrolytes. They are also less expensive compared with their polymeric derivatives.

From the standpoint of industrial handling, most of these simple glycols are considered non-hazardous. The greatest hazard to health which may be presented by these glycols is that of direct ingestion in a substantial amount. Based on laboratory test data, propylene, butylene, and tetraethylene glycols are the least toxic, followed by diethylene, triethylene, and dipropylene glycols. Ethylene and tripropylene glycols are considered to be the most toxic. The molecular weights and single-dose oral $LD_{50}$ values of some simple glycols that can be found in the literature are listed below:

|  | $LD_{50}$* | Mole. Wt. |
| --- | --- | --- |
| Tripropylene Glycol | ~3 gm/KG | 192.26 |
| Ethylene Glycol | 6–12 gm/KG | 62.07 |
| Dipropylene Glycol | ~15 gm/KG | 134.18 |
| Diethylene Glycol | 16–21 gm/KG | 106.12 |
| Triethylene Glycol | 16–22 gm/KG | 150.17 |
| Propylene Glycol | 21–34 gm/KG | 76.10 |
| Butylene Glycol | 23–30 gm/KG | 90.12 |
| Tetraethylene Glycol | ~31 gm/KG | 194.23 |

*From Clayton, G. D. and Clayton, F. E., Patty's Industrial Hygiene and Toxicology, John Wiley and Sons, 1978.

The simple glycols are useful for lowering water activity and freezing point of an aqueous solution. At moderate concentrations, they can lower the water activity to a level equal to or less than that of most gumbo shales commonly encountered in offshore drilling. This lowering of water activity aids in preventing water adsorption through osmotic effects. The lowering of the freezing point can be utilized to prevent the formation of gas hydrates in deep water drilling while eliminating the use of large amounts of salts.

The water-based drilling fluid system of this invention comprises a water-miscible glycol with a molecular weight of less than about 200, such as ethylene glycol, diethylene glycol, triethylene glycol, propylene glycol, butylene glycol and mixtures thereof, in a range from 30% to 70% by weight, preferably 30% to 50% by weight of the aqueous phase of the said drilling fluid. Incorporated in the aqueous phase of the drilling fluid is an organic cationic material selected from the group consisting of choline hydroxide, choline chloride, choline carbonate, choline bicarbonate, choline sulfate and mixtures thereof, or an organic potassium salt such as potassium acetate or potassium formate, preferably choline chloride, in a range from 3% by weight up to saturation, preferably 5% to 20% by weight of the aqueous phase.

A filtration control agent may be added to control the fluid loss of the drilling fluid. Suitable filtration control agents are well known in the art and may include but are not limited to polyanionic cellulose, polyacrylate, polysaccharide, lignite, lignosulfonate, and mixtures thereof.

A viscosifier, such as biopolymers, clays and mixtures thereof, also may be added to increase viscosity and suspend solids and weighting materials.

The density of the drilling fluids can be adjusted by using barite, hematite, calcium carbonate, and mixtures thereof.

To minimize solubilization problems of polymer additives that may be encountered at high concentrations of glycol, the filtration control agent and viscosifier should be pre-solubilized in water before the addition of glycol.

To evaluate the inhibitive effects of the drilling fluid of this invention, the following tests were conducted.

1. Triaxial Test

The borehole stabilization effects of drilling fluids of this invention on argillaceous rocks have been evaluated using a Triaxial Shale Tester developed by M-I Drilling Fluids L.L.C. This device, which is described in Lee, John, "Overview of Shale Stability Testing," Drilling & Completion Fluids, p. 15, May/June 1994, allows circulation of a drilling fluid through a borehole drilled in a cylindrical argillaceous core sample under simulated downhole conditions. Axial pressure, confining pressure, and drilling fluid pressure are applied on the cylindrical core sample while the drilling fluid is circulating. The drilling fluid and the core sample are also heated to and maintained at desired temperatures during circulation. The circulation time varies from 20 hours to 48 hours. At the end of the triaxial test, changes in wellbore conditions, weight, and moisture content of the core sample are determined for evaluation of the inhibitive effects of the drilling fluid.

2. Swelling Test

The swelling inhibition effects of drilling fluids of this invention on water-sensitive shales have been evaluated by performing swelling tests using a Computer-Aided Swellmeter developed by M-I Drilling Fluids L.L.C. This device is described in, Lee, John, "Swellmeter Analysis," M-I® TECH-NEWS, November 1989. Pellets with 1 inch diameter, prepared by compressing pulverized water-sensitive shales under controlled loads, are placed in specially designed holders and allowed to be in direct contact with test fluids. The pellets are allowed to adsorb test fluids and swell for a period of time ranging from about 60 to 120 hours in the test fluids. Volume expansions of the pellets are recorded by using liner variable differential transformers. The volume expansions of the pellets and slopes of the swelling curves at the end of the test are used to evaluate the water adsorption and swelling inhibition of the test fluids.

3. Hot-Rolling Dispersion Test

The dispersion inhibition effects of drilling fluids of this invention also have been evaluated by performing hot-rolling dispersion tests. A known amount of argillaceous rock sample with known particle size ranges is put into glass pint jars containing the test fluids. The pint jars are hot-rolled in an oven at a temperature of 150° F. for 16 hours. After hot rolling, the remaining samples are recovered using a sieve of known size and dried to a constant weight at controlled temperatures, usually 150°–200° F. The weight losses and physical integrity of the recovered samples are used to evaluate the dispersion inhibition of the test fluids.

EXAMPLE 1

Water-based fluids containing diethylene glycol at concentrations ranging from 0% to 70% by weight of the aqueous phase were prepared and tested for their swelling inhibition effects without the benefits of the present invention. A viscosifier, such as XCD biopolymer manufactured by Kelco, and a fluid loss control agent, such as POLYPAC R marketed by M-I Drilling Fluids L.L.C., were added individually to each water-diethylene glycol mixture and sheared for at least 30 minutes for proper dispersion of the polymers. The fluids were hot rolled at 150° F. for 16 hours before running swelling inhibition tests. The water activity of each fluid was also measured at room temperature using a hand held relative humidity and temperature indicator, Model 880, manufactured by General Eastern. The formulation and water activity of the fluids are shown in Table 1.

TABLE 1

Formulation and Water Activity of Diethylene Glycol Fluids

|  | A | B | C | D | E | F |
|---|---|---|---|---|---|---|
| Freshwater, ml | 350.0 | 253.0 | 219.5 | 184.8 | 149.5 | 113.5 |
| D.E.G., g | — | 108.4 | 146.2 | 184.8 | 224.2 | 264.6 |
| D.E.G., % wt | — | 30 | 40 | 50 | 60 | 70 |
| Biopolymer, g | 0.7 | 0.7 | 0.7 | 0.7 | 0.7 | 0.7 |
| POLYPAC R, g | 1.0 | 1.0 | 1.0 | 1.0 | 1.0 | 1.0 |
| Water Activity | 1.00 | 0.93 | 0.87 | 0.83 | 0.75 | 0.64 |

The swelling tests were performed according to the test procedures given above. The argillaceous rock used for the tests was a "gumbo shale" obtained from offshore Louisiana. The gumbo shale was pulverized and pressed into 1 inch diameter pellets under 10,000 pounds of force for 5 minutes. The volume expansions of the pellets and the swelling rates calculated from swelling data obtained between 55 and 60 hours of the test are shown in Table 2.

TABLE 2

Volume Expansions and Swelling Rates of Louisiana Gumbo in Control and Diethylene Glycol Fluids

| Fluid | Exposure Time | Volume Expansion | Swelling Rate* |
|---|---|---|---|
| A | 60 hrs | 54.56% | 0.5016%/hr |
| B | 60 hrs | 51.68% | 0.2732%/hr |
| C | 60 hrs | 46.08% | 0.1837%/hr |
| D | 60 hrs | 45.05% | 0.0449%/hr |
| E | 60 hrs | 37.80% | 0.0296%/hr |
| F | 60 hrs | 38.27% | 0.0147%/hr |

*Determined using swelling data at 55 and 60 hours of test

The swelling rates shown in Table 2 indicate that swelling of the pellets exposed to fluids containing more than 50% by weight of diethylene glycol had levelled off after 60 hours; whereas with those exposed to fluids containing less than 50% by weight of diethylene glycol, swelling was still occurring at relatively high rates. Apparently, to minimize the water adsorption and swelling of the gumbo shale, it was necessary to have a glycol content greater than 50% by weight.

The swelling test results also indicated that swelling of the gumbo shale was time dependent. To determine the effect of time on swelling, the gumbo shale pellets were allowed to swell in the test fluids for an additional 55 hours. The volume expansions of the gumbo shale after a total of 115 hours are given in Table 2A, which clearly shows that further swelling had occurred in all the fluids and the amount of additional swelling was in general agreement with the prediction based on the swelling rates determined at 55–60 hours. This time-dependent swelling, which is often encountered with water-sensitive shales, must be taken into consideration during swelling tests. Results obtained from short-term tests, e.g., less than 2 hours, could be misleading if the swelling rates are not considered.

TABLE 2A

| Fluid | Exposure Time | Volume Expansion |
|---|---|---|
| A | 115 hrs | 77.59% |
| B | 115 hrs | 62.84% |
| C | 115 hrs | 54.43% |
| D | 115 hrs | 47.04% |
| E | 115 hrs | 39.80% |
| F | 115 hrs | 39.60% |

EXAMPLE 2

The swelling inhibitions of the diethylene glycol fluids containing organic (choline chloride) and inorganic (potassium chloride) cationic material were compared by performing swelling tests on the same gumbo shale used in Example 1. The formulations of the fluids and volume expansions of the gumbo shale at the end of a 60-hour test are given in Tables 3 and 4, respectively.

TABLE 3

Formulations of Diethylene Glycol Fluids Containing Choline Chloride and Potassium Chloride

|  | G | H | I | J | K | L |
|---|---|---|---|---|---|---|
| Freshwater, ml | 253.0 | 219.5 | 184.5 | 253.0 | 219.5 | 185.0 |
| D.E.G., g | 109.2 | 146.8 | 184.9 | 108.4 | 146.2 | 184.3 |
| D.E.G., % wt | 30.0 | 40.0 | 50.0 | 30.0 | 40.0 | 50.0 |
| Biopolymer, g | 0.7 | 0.7 | 0.7 | 0.7 | 0.7 | 0.7 |
| POLYPAC R, g | 1.0 | 1.0 | 1.0 | 1.0 | 1.0 | 1.0 |
| Choline Chloride, g | 22.3 | 22.3 | 22.3 | — | — | — |
| KCl, g | — | — | — | 15.5 | 15.5 | 15.5 |

TABLE 4

Volume Expansions and Swelling Rates of Louisiana Gumbo Shales in Diethylene Glycol Fluids Containing Choline Chloride and Potassium Chloride

| Fluid | Exposure Time | Volume Expansion | Swelling Rates* |
|---|---|---|---|
| G | 60 hrs | 45.00% | 0.0000%/hr |
| H | 60 hrs | 43.58% | 0.0152%/hr |
| I | 60 hrs | 40.64% | 0.0449%/hr |
| J | 60 hrs | 48.70% | 0.0603%/hr |
| K | 60 hrs | 51.03% | 0.0304%/hr |
| L | 60 hrs | 44.61% | 0.0599%/hr |

*Determined using swelling data at 55 and 60 hours of test

The swelling test results indicated that both cationic materials improved the swelling inhibition of diethylene glycol fluids; and the organic cationic material (Choline Chloride) was more effective than the inorganic cationic material (Potassium Chloride). The swelling rates of the gumbo also indicated that a quicker swelling stabilization could be obtained at a lower glycol content using the organic cationic material. When compared with results given in Example 1, the fluids of this invention apparently were more inhibitive than those without the benefits of the present invention.

EXAMPLE 3

As an example to illustrate the preparation of drilling fluids using diethylene glycol and choline chloride of this invention, muds of one lab barrel equivalent volume (350 ml) with densities up to 15.0 ppg were mixed, heat aged and evaluated. The formulations of these drilling fluids are shown in Table 5, in which the additives are listed in the order of their addition to the fluid.

The fluid loss control additive, viscosifier, and pH control agent were individually added to the freshwater while an adequate stirring was provided using a single spindle mixer. A stirring time of 30–45 minutes was sufficient for these additives to hydrate properly. The diethylene glycol was then added to the fluid to reach the desired concentration, namely 30% by weight of the aqueous phase. Weighting material, barite, and the organic cationic material, choline chloride, were added subsequently. After an additional mixing of 20–30 minutes, the drilling fluids were placed in an oven and hot rolled at 150° F. for 16 hours.

The properties of the drilling fluids after heat aging, which are shown in Table 6, indicate reasonably good flow property and fluid loss control could be achieved without any difficulties. The rheological properties were measured at 120° F.

TABLE 5

Formulations of Drilling Fluids Containing 30% by Weight of Diethylene Glycol and Choline Chloride with a Density up to 15.0 ppg

|  | A | B | C | D |
|---|---|---|---|---|
| Freshwater, ml | 238.55 | 215.71 | 196.66 | 177.61 |
| Starch, g | 6.00 | 5.00 | — | — |
| POLYPAC UL, g | — | — | 2.00 | 2.00 |
| Biopolymer, g | 1.00 | 0.80 | 0.65 | 0.40 |
| Soda Ash, g | 0.50 | 0.50 | 0.50 | 0.50 |
| D.E.G., g | 102.23 | 92.45 | 84.28 | 76.12 |
| Barite, g | — | 133.33 | 244.54 | 355.76 |
| Choline Chloride, g | 22.3 | 22.3 | 22.3 | 22.3 |

TABLE 6

Properties of Drilling Fluids Containing 30% by Weight of Diethylene Glycol and Choline Chloride with a Density up to 15.0 ppg

|  | A | B | C | D |
|---|---|---|---|---|
| Mud Wt., ppg | 8.6 | 11.0 | 13.0 | 15.0 |
| PV, cp | 10 | 15 | 28 | 41 |
| YP, lb/100 ft2 | 14 | 16 | 24 | 7 |
| 10"/10' Gels | 4/5 | 4/4 | 4/6 | 2/2 |
| pH | 10.4 | 10.4 | 10.5 | 10.4 |
| API Fluid Loss | 12.2 | 5.2 | 6.0 | 5.8 |
| Water Activity | 0.92 | — | — | — |

EXAMPLE 4

Another similar evaluation of drilling fluids containing 50% by weight of diethylene glycol with about 6–8% by weight of choline chloride was conducted. One lab barrel equivalent (350 ml) of each of the following fluids with densities up to 15.0 ppg was prepared and tested. Similar to previous examples, the fluid loss control agent, viscosifier, and pH control agent were pre-solubilized in freshwater before the diethylene glycol was added to reach the desired concentration. Weighting material, barite, and choline chloride were added subsequently. The drilling fluids were hot rolled at 150° F. for 16 hours before measuring their properties. The formulations and properties of the drilling fluids with 50% by weight of diethylene glycol and choline chloride are shown in Tables 7 and 8. The rheological properties were measured at 120° F. Again, these drilling fluids showed reasonably good rheological properties and fluid loss control.

TABLE 7

Formulations of Drilling Fluids Containing 50% by Weight of Diethylene Glycol and Choline Chloride with a Density up to 15.0 ppg

|  | E | F | G | H |
|---|---|---|---|---|
| Freshwater, ml | 174.19 | 158.74 | 144.72 | 130.71 |
| Starch, g | 5.00 | 5.00 | — | — |
| POLYPAC UL, g | — | — | 2.00 | 2.00 |
| Biopolymer, g | 0.75 | 0.60 | 0.45 | 0.30 |
| Soda Ash, g | 0.50 | 0.50 | 0.50 | 0.50 |
| D.E.G., g | 174.19 | 158.74 | 144.72 | 130.71 |
| Barite, g | — | 123.56 | 235.58 | 347.61 |
| Choline Chloride, g | 22.3 | 22.3 | 22.3 | 22.3 |

TABLE 8

Properties of Drilling Fluids Containing 50% by Weight of Diethylene Glycol and Choline Chloride with a Density up to 15.0 ppg

|  | E | F | G | H |
|---|---|---|---|---|
| Mud Wt., ppg | 8.8 | 11.0 | 13.0 | 15.0 |
| PV | 11 | 18 | 32 | 50 |
| YP | 13 | 14 | 29 | 13 |
| 10"/10' Gels | 3/5 | 3/4 | 4/4 | 2/2 |
| pH | 10.6 | 10.6 | 10.6 | 10.6 |
| API Fluid Loss | 12.4 | 2.6 | 6.0 | 5.2 |
| Water Activity | 0.82 | — | — | — |

EXAMPLE 5

The solids tolerance of the drilling fluids shown in Example 4 was evaluated by contaminating each fluid with 4% by volume, equivalent to 36 lb/bbl, of Rev Dust, which is a fine-grained low gravity solids commonly used for solids contamination tests by the drilling fluid industry. The drilling fluids with Rev Dust were hot rolled in an oven for 64 hours at 150° F. The properties of the hot rolled fluids were then determined. The results are shown in Table 9. The rheological properties were measured at 120° F.

TABLE 9

Properties of Drilling Fluids Containing 50% by Weight of Diethylene Glycol and Choline Chloride After Contamination with Low Gravity Solids

|  | E | F | G | H |
|---|---|---|---|---|
| PV | 17 | 27 | 47 | 63 |
| YP | 17 | 22 | 20 | 25 |
| 10"/10' Gels | 5/6 | 5/6 | 5/8 | 3/10 |
| pH | 7.3 | 7.2 | 7.7 | 7.7 |
| API Fluid Loss | 2.4 | 6.4 | 6.0 | 5.2 |

These results show that the drilling fluids according to the present invention are relatively stable and can tolerate solids contamination.

EXAMPLE 6

The swelling inhibition and shale stabilization of propylene glycol and butylene glycol based drilling fluids with and without organic cationic material were evaluated by conducting swelling tests and hot rolling dispersion tests. The material used for swelling tests was a highly reactive bentonitic shale obtained from offshore Mexico. The material used for hot rolling dispersion tests was the same Louisiana gumbo shale used in the previous swelling tests. The formulations of the drilling fluids and test results are given in Tables 10, 10A, 11, and 12.

TABLE 10

Formulations of Drilling Fluids Containing Propylene Glycol and Butylene Glycol With and Without Organic Cations

|  | A | B | C | D | E | F | G | H |
|---|---|---|---|---|---|---|---|---|
| Freshwater, ml | 254.4 | 206.7 | 159.0 | 111.4 | 235.48 | 190.19 | 144.91 | 99.64 |
| POLYPAC UL, g | 2.00 | 2.00 | 2.00 | 2.00 | 2.00 | 2.00 | 2.00 | 2.00 |
| Biopolymer, g | 1.0 | 0.75 | 0.60 | 0.40 | 1.0 | 0.75 | 0.50 | 0.35 |
| NaOH, g | Trace | Trace | Trace | Trace | Trace | Trace | Trace | Trace |
| Propyl. Glycol, g | 50.00 | 100.00 | 150.00 | 200.00 | 50.00 | 100.00 | 150.00 | 200.00 |
| Barite, g | 200.2 | 198.1 | 195.9 | 193.8 | 194.53 | 190.27 | 185.99 | 181.69 |
| Choline Chloride, g | 0.0 | 0.0 | 0.0 | 0.0 | 25.00 | 25.00 | 25.00 | 25.00 |

TABLE 10A

Formulations of Drilling Fluids Containing Propylene Glycol and Butylene Glycol With and Without Organic Cations

|  | I | J | K | L | M | N |
|---|---|---|---|---|---|---|
| Freshwater, ml | 269.78 | 215.90 | 161.94 | 247.60 | 194.37 | 141.14 |
| POLYPAC UL, g | 2.00 | 2.00 | 2.00 | 2.00 | 2.00 | 2.00 |
| Biopolymer, g | 1.0 | 0.75 | 0.50 | 1.00 | 0.75 | 0.50 |
| Soda Ash, g | 0.25 | 0.25 | 0.25 | 0.25 | 0.25 | 0.25 |
| Butyl. Glycol, g | 54.27 | 108.50 | 162.80 | 53.57 | 107.14 | 160.71 |
| Barite, g | 216.13 | 215.83 | 215.52 | 212.67 | 212.34 | 212.04 |
| Choline Chloride, g | 0.0 | 0.0 | 0.0 | 26.79 | 26.79 | 26.79 |

TABLE 11

Volume Expansions and Swelling Rates of Bentonitic Shale in Glycol Fluids With and Without Organic Cations

| Fluid | Exposure Time | Volume Expansion | Swelling Rate* |
|---|---|---|---|
| Water | 60 hrs | 249.62% | 0.2314 %/hr |
| A | 60 hrs | 59.13% | 0.5073 %/hr |
| B | 60 hrs | 51.06% | 0.3336 %/hr |
| C | 60 hrs | 31.60% | 0.1173 %/hr |
| D | 60 hrs | 24.02% | 0.1732 %/hr |
| E | 60 hrs | 44.63% | 0.00 %/hr |
| F | 60 hrs | 39.92% | 0.00 %/hr |
| G | 60 hrs | 33.05% | 0.00 %/hr |
| H | 60 hrs | 40.83% | 0.00 %/hr |
| I | 60 hrs | 73.36% | 0.4075 %/hr |
| J | 60 hrs | 62.14% | 0.1890 %/hr |
| K | 60 hrs | 54.03% | 0.0293 %/hr |
| L | 60 hrs | 49.71% | 0.00 %/hr |

TABLE 11-continued

Volume Expansions and Swelling Rates of Bentonitic
Shale in Glycol Fluids With and Without
Organic Cations

| Fluid | Exposure Time | Volume Expansion | Swelling Rate* |
|---|---|---|---|
| M | 60 hrs | 36.86% | 0.00 %/hr |
| N | 60 hrs | 52.00% | 0.00 %/hr |

*Determined using swelling data at 55 and 60 hours of test

TABLE 12

Hot Rolling Dispersion Test of Louisiana Gumbo
Shale at 150° F. for 16 Hours in Glycol Fluids
With and Without Organic Cations

| Fluid | Initial/Recovered Wt. | % Wt Loss* | Integrity |
|---|---|---|---|
| A | 20.00/15.03 g | 24.85 | Soft & Swelled |
| B | 20.00/15.10 g | 24.50 | Soft & Swelled |
| C | 20.00/14.64 g | 26.80 | Soft & Swelled |
| D | 20.00/13.91 g | 30.95 | Mod. Swelling |
| E | 20.00/14.32 g | 28.40 | Firm |
| F | 20.00/15.09 g | 24.55 | Firm |
| G | 20.00/15.51 g | 22.45 | Firm |
| H | 20.00/14.87 g | 25.65 | Firm |
| I | 20.00/16.50 g | 17.50 | Soft & Gummy |
| J | 20.00/14.77 g | 26.15 | Soft & Gummy |
| K | 20.00/15.50 g | 22.50 | Soft & Gummy |
| L | 20.00/14.75 g | 26.25 | Firm |
| M | 20.00/14.18 g | 29.10 | Firm |
| N | 20.00/12.93 g | 35.35 | Firm |

Note: Shale was recovered with a 50-mesh screen
*Not corrected for initial water content of shale.

These tests showed that the present invention reduced the volume expansion and/or swelling rates of the shale in the swelling tests and improved the integrity of the samples in the dispersion tests. The improvement observed with the swelling and dispersion tests was a result of the reduction of water adsorption and clay hydration by the invention.

EXAMPLE 7

The borehole stabilization effects of a drilling fluid containing 30% by weight of diethylene glycol in the liquid phase was evaluated by performing triaxial tests using the procedures outlined above under Shale Triaxial Tester.

The drilling fluid was prepared using the procedures given below:

1. Measure a desired amount of freshwater into a 2-liter capacity steel cup.
2. Add a desired amount of fluid loss control agent and mix for 5 minutes at 5000 rpm using a single spindle mixer.
3. Add a desired amount of viscosifier and mix for 5 minutes at 5000 rpm.
4. Add a desired amount of pH control agent and mix for 5 minutes at 5000 rpm.
5. Add a desired amount of glycol and shear for 10 minutes at 8000 rpm on a Silverson Mixer.
6. Add a desired amount of weighting agent and mix for 30 minutes at 5000 rpm using a single spindle mixer.
7. Hot roll the drilling fluid at 150° F. for 16 hours.

The composition and properties of the drilling fluid after hot rolling are shown in Tables 13 and 14. The rheological properties were measured at 120° F.

TABLE 13

Composition of a 12.0 ppg Drilling Fluid Containing
30% by Weight of Diethylene Glycol

| Freshwater | 0.615 bbl |
|---|---|
| POLYPAC UL | 2.0 ppb |
| Biopolymer | 0.75 ppb |
| Soda Ash | 0.25 ppb |
| Diethylene Glycol | 100 ppb |
| Barite | 190 ppb |

TABLE 14

Mud Properties of a 12.0 ppg Drilling Fluid
Containing 30% by Weight of Diethylene Glycol

| Mud Weight, ppg | 12.0 |
|---|---|
| PV | 31 |
| YP | 31 |
| 10"/10' Gels | 7/8 |
| API Fluid Loss, ml | 7.4 |
| pH | 9.5 |

The argillaceous material used for the test was an unconsolidated gumbo shale obtained from offshore Louisiana. The gumbo shale was pressed into a 1½ inch diameter cylindrical plug about 1–1½ inches long by compressing under 25,000 pounds of force for 2½ to 3 hours in a die set. A ½" borehole was then drilled along the axial center of the plug for circulation of the said drilling fluid. The temperature, pressures, estimated mud flow rate, and duration of the Test are given in Table 15.

TABLE 15

Conditions for Triaxial Test of a 12.0 ppg Drilling
Fluid Containing 30% by Weight of Diethylene Glycol

| Confining Pressure | 1,400 psi |
|---|---|
| Borehole Pressure | 1,400 psi |
| Overburden Pressure | 1,500 psi |
| Test Temperature | 150 °F. |
| Estimated Flow Rate | 1 gpm |
| Duration of Test | 22 hrs |

After circulating the drilling fluid through the gumbo core plug for 22 hours, the core plug was removed for visual examination. It was found that the argillaceous material around the wellbore had swelled into and completely plugged the borehole. After drying at 150° F., weight loss determinations showed that the moisture content of the argillaceous material increased from an initial value of 14.35% to a final value of 19.62%. Thus, the drilling fluid containing 30% by weight of diethylene glycol did not prevent water adsorption, hence could not provide any swelling inhibition or wellbore stabilization.

EXAMPLE 8

To evaluate the shale stabilizing effects of diethylene glycol drilling fluid containing organic cationic material, the same drilling fluid used in Example 7 was treated with 25 ppb choline chloride and the triaxial test was repeated using another core plug prepared from the same gumbo shale. The drilling fluid was circulated for 24 hours at 150° F. under similar test conditions as in Example 7.

At the end of the test, the borehole showed some reductions around the wellbore. The reduction in borehole diameter was estimated to be less than 30%. Moisture content determination indicated a final moisture content of 16.83%, which is a significant reduction compared with the result shown in Example 7. The combination of diethylene glycol and organic cationic material thus reduced the swelling of wellbore and improved the borehole stability by minimizing water adsorption and clay hydration.

EXAMPLE 9

To evaluate the borehole stabilizing effects of the diethylene glycol fluid containing KCl, another 12.0 ppg drilling fluid was prepared using the same method as outlined in Example 7. The formulation and properties of the fluid after the triaxial test are shown in Tables 16 and 17, respectively. The rheological properties were measured at 120° F. The argillaceous material used for the test was the same as that used in Examples 7 and 8, and was prepared similarly.

TABLE 16

Formulation of a 12.0 ppg Drilling Fluid Containing 30% by Weight of Diethylene Glycol and KCl Used for Triaxial Test

| Freshwater | 0.615 bbl |
|---|---|
| POLYPAC UL | 2.0 ppb |
| Biopolymer | 0.75 ppb |
| Soda Ash | 0.25 ppb |
| KCl | 12.9 ppb |
| Diethylene Glycol | 100 ppb |
| Barite | 190 ppb |

TABLE 17

Properties of a 12.0 ppg Drilling Fluid Containing 30% by Weight of Diethylene Glycol and KCl

| Mudd Weight, ppg | 12.0 |
|---|---|
| PV | 22 |
| YP | 12 |
| 10"/10' Gels | 3/4 |
| API Fluid Loss, ml | 6.4 |
| pH | 9.3 |

After circulating the drilling fluid at 150° F. for 24 hours, visual examinations showed a 40–50% reduction of the borehole due to swelling of the argillaceous material around the wellbore. Moisture content determination also showed that it increased from an initial value of 14.5% to a final value of 19.07% by weight. Compared with previous results, prevention of water adsorption and hydration of clays in the diethylene glycol/KCl fluid was not as effective as in the diethylene glycol/choline chloride fluid, but it was better than the diethylene glycol mud without any cationic materials.

EXAMPLE 10

Triaxial tests of propylene glycol and butylene glycol based drilling fluids with and without organic cationic materials were conducted to evaluate their borehole stabilization effects. The same test procedures and argillaceous materials as in Examples 7, 8 and 9 were used for the triaxial tests. The formulations and mud properties of the drilling fluids are shown in Table 18 and the results are summarized in Table 19. Again the triaxial test results indicated that the addition of organic cationic material could significantly reduce water adsorption and clay hydration, and improve the wellbore stabilizing effects of glycol fluids.

TABLE 18

Formulations and Properties of Propylene Glycol and Butylene Glycol Based Drilling Fluids With and Without Organic Cationic Material

|  | A | B | C | D |
|---|---|---|---|---|
| Freshwater, ml | 175.00 | 200.00 | 216.00 | 194.50 |
| Starch, g | 5.00 | — | — | — |
| POLYPAC UL, g | — | 2.00 | 2.00 | 2.00 |
| Biopolymer, g | 1.00 | 0.75 | 0.75 | 0.75 |
| Soda Ash, g | — | 1.00 | 0.25 | 0.25 |
| NaOH, g | Trace | 0.25 | — | — |
| Sea Salt, g | — | 8.40 | — | — |
| NaCl, g | 20.00 | — | — | — |
| Propyl. Glycol, g | 175.00 | 100.00 | — | — |
| Butyl. Glycol, g | — | — | 108.50 | 107.2 |
| Rev Dust, g | 15.00 | — | — | — |
| Barite, g | — | 185.00 | 215.90 | 212.00 |
| Choline Chloride, g | — | 25.00 | — | 26.80 |
| Mud Wt., ppg | 10.0 | 12.0 | 12.0 | 12.0 |
| PV | 21 | 27 | 34 | 30 |
| YP | 5 | 26 | 33 | 32 |
| 10"/10' Gels | 3/4 | 5/7 | 7/9 | 7/8 |
| API, ml | 6.4 | 4.0 | 5.6 | 4.8 |
| pH | 9.3 | 9.8 | 9.2 | 8.7 |
| Water Activity | 0.68 | 0.845 | 0.89 | 0.875 |

TABLE 19

Triaxial Test Results of Louisiana Gumbo Shale Core Plugs in Propylene Glycol and Butylene Glycol Drilling Fluids With and Without Organic Cationic Material

| Fluid | Borehole Reduction | Water Content | Temperature/Time |
|---|---|---|---|
| A | 50% Reduction | Initial: 19.65%<br>Final: 19.11% | 150° F./48 hrs |
| B | No Reduction | Initial: 18.16%<br>Final: 17.61% | 150° F./48 hrs |
| C | 90% Reduction | Initial: 15.07%<br>Final: 19.67% | 150° F./24 hrs |
| D | 30% Reduction | Initial: 14.20%<br>Final: 17.37% | 150° F./24 hrs |

Although this invention has been described with respect to the presently preferred embodiments, it will be appreciated by those skilled in the art that many changes can be made to the drilling fluids without departing from its spirit or essential characteristics. Accordingly, all changes or modifications that come within the meaning and range of equivalency of the claims are to be embraced within their scope.

What is claimed is:

1. A water-based drilling fluid comprising:
    a glycol with a molecular weight of less than about 200 at a concentration of at least 10% by weight of the aqueous phase of said drilling fluid said glycol being selected from the group consisting of ethylene glycol, diethylene glycol, triethylene glycol, propylene glycol, butylene glycol and mixtures thereof;
    an organic cationic material in a concentration of at least bout 3% by weight of the aqueous phase of said drilling fluid, said organic cationic material being selected from the group consisting of choline hydroxide, choline chloride, choline carbonate, choline bicarbonate, choline sulfate and mixtures thereof;
    a filtration control agent for lowering fluid loss of said drilling fluid;
    a viscosifier for suspension of solids or weighting materials in said drilling fluid; and water.

2. The drilling fluid of claim 1 wherein the glycol concentration is in the range of 30% to 50% by weight of the aqueous phase.

3. The drilling fluid of claim 1 wherein the organic cationic material comprises a salt of choline.

4. The drilling fluid of claim 1 wherein the organic cationic material is choline chloride.

5. The drilling fluid of claim 1 wherein the organic cationic material concentration is in the range of 5% to 20% by weight of the aqueous phase.

6. A water-based drilling fluid comprising:

a glycol with a molecular weight of less than about 200 at a concentration of at least 10% by weight of the aqueous phase of said drilling fluid said glycol being selected from the group consisting of ethylene glycol, diethylene glycol, triethylene glycol, propylene glycol, butylene glycol and mixtures thereof;

a salt of choline in a concentration of at least about 3% by weight of said drilling fluid said salt of choline being selected from the group consisting of choline hydroxide, choline chloride, choline carbonate, choline bicarbonate, choline sulfate and mixtures thereof;

a filtration control agent for lowering fluid loss of said drilling fluid;

a viscosifier for suspension of solids or weighting materials in said drilling fluid; and water.

7. The drilling fluid of claim 6 wherein the glycol is diethylene glycol.

8. The drilling fluid of claim 6 wherein the glycol concentration is in the range of 30% to 70% by weight of the aqueous phase.

9. The drilling fluid of claim 8 wherein the glycol concentration is in the range of 30% to 50% by weight of the aqueous phase.

10. The drilling fluid of claim 6 wherein the salt of choline is choline chloride.

11. The drilling fluid of claim 6 wherein the concentration of the salt of choline is in the range of 5% to 20% by weight of the aqueous phase.

12. A method of reducing water adsorption and hydration of argillaceous rocks during drilling with a water based drilling fluid comprising:

preparing a water-based drilling fluid by pre-solubilizing a fluid loss control agent, a viscosifier, and a pH control agent in a make-up fluid, adding a glycol with a molecular weight of less than about 200 at a concentration of at least 10% by weight of the aqueous phase of said drilling fluid said glycol being selected from the group consisting of ethylene glycol, diethylene glycol, triethylene glycol, propylene glycol, butylene glycol and mixtures thereof, adding a salt of choline to said drilling fluid in a concentration of at least about 3% by weight of said aqueous phase, said salt of choline being selected from the group consisting of choline hydroxide, choline chloride, choline carbonate, choline bicarbonate, choline sulfate and mixtures thereof, and adjusting the weight of said drilling fluid by adding a weighting material; and circulating said drilling fluid through said argillaceous rock during drilling.

13. The method of claim 12 wherein the salt of choline is choline chloride.

14. The method of claim 12 wherein the salt of choline is added in a concentration in the range of 5% to 20% of the aqueous phase.

15. A water based drilling fluid comprising:

a glycol with a molecular weight of less than about 200 at a concentration of at least 10% by weight of the aqueous phase of said drilling fluid said glycol being selected from the group consisting of ethylene glycol, diethylene glycol, triethylene glycol, propylene glycol, butylene glycol and mixtures thereof;

an organic salt of potassium in a concentration of at least about 3% by weight of the aqueous phase of said drilling fluid;

a filtration control agent for lowering fluid loss of said drilling fluid;

a viscosifier for suspension of solids or weighting materials in said drilling fluid; and water.

16. The drilling fluid of claim 15 wherein the organic salt of potassium is potassium acetate.

17. The drilling fluid of claim 15 wherein the organic salt of potassium is potassium formate.

18. The drilling fluid of claim 15 wherein the organic salt of potassium concentration is in the range of 5% to 20% by weight of the aqueous phase.

* * * * *